United States Patent
Paganini et al.

[11] Patent Number: 6,040,637
[45] Date of Patent: *Mar. 21, 2000

[54] SELECTOR SWITCH CIRCUIT FOR DISABLING AN AIRBAG

[75] Inventors: Lisa M. Paganini, Howell; Frank Casilio, Troy; Roy Peters, Almont; Kurt M. Straub, Plymouth; Rene C. DeHondt, Armada; Tova Fry, Detroit, all of Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/053,037

[22] Filed: Apr. 1, 1998

[51] Int. Cl.[7] .................................................. B60R 21/16
[52] U.S. Cl. ........................ 307/10.1; 280/728.1; 307/39
[58] Field of Search ..................... 307/9.1, 10.1, 307/39, 38, 85, 112, 113, 116, 121, 125, 139; 701/45, 36; 340/436, 438, 727; 280/728.1; 180/282, 283

[56] References Cited

U.S. PATENT DOCUMENTS

| | | | |
|---|---|---|---|
| 4,346,913 | 8/1982 | Schrauf et al. | 280/735 |
| 4,956,631 | 9/1990 | Itoh | 340/436 |
| 5,165,717 | 11/1992 | Tanaka . | |
| 5,318,146 | 6/1994 | Witte . | |
| 5,324,074 | 6/1994 | Christian et al. . | |
| 5,428,340 | 6/1995 | Kawabuta et al. . | |
| 5,460,404 | 10/1995 | Damisch et al. | 280/735 |
| 5,541,523 | 7/1996 | Tourville et al. | 324/711 |
| 5,544,914 | 8/1996 | Borninski et al. . | |
| 5,564,737 | 10/1996 | Ito et al. | 280/735 |

*Primary Examiner*—Jeffrey Gaffin
*Assistant Examiner*—Kim Huynh
*Attorney, Agent, or Firm*—Roland A. Fuller, III

[57] ABSTRACT

An airbag control system is provided to disable an airbag in a motor vehicle. The airbag control system includes an airbag control module, a switching circuit with a first circuit path and a second circuit path, and a switch selectively movable between an enabled position, which interconnects the first circuit path to the airbag control module to activate the airbag, and a disabled position, which interconnects the second circuit path to the airbag control module to prevent activation of the airbag. In addition, the system includes a third circuit path with a first resistor in series with a second resistor which is placed in parallel with a second contact of said switch. Alternatively, a controller is electrically connected through the third circuit path to the switch. The controller detects the position of the switch based on the resistance value it senses in the third circuit path. A visual indicator is optionally connected to the controller, whereby selectively moving the switch to the disabled position sends a signal from the controller to illuminate the visual indicator.

12 Claims, 3 Drawing Sheets

SELECTOR SWITCH CIRCUIT FOR DISABLING AN AIRBAG

BACKGROUND OF THE INVENTION

1. Field of the Invention

The present invention relates generally to a mechanism for disabling vehicle occupant restraint systems and, more particularly, to a selector switch circuit for disabling a passenger side airbag.

2. Discussion

Occupant restraint systems, and in particular inflatable airbags, have come into widespread use in the automotive industry. In certain instances it may be desirable to provide a switching mechanism for disabling operation of the airbag system on a selective basis while the vehicle is in use. For instance, an occupant restraint system with a passenger side airbag should be disabled when a rear facing infant seat is placed in the passenger position. Due to the importance of these safety systems, it is also important that the reliability of its components be monitored and tested during vehicle operation. Detecting a faulty condition in the switching mechanism that may lead to undesired deployment of the passenger airbag, as well as determining the position of a selector switch at airbag deployment are two such system conditions that should be monitored. In addition, under current Federal safety standards (i.e., MVSS-208) it is required that occupant restraint system provide an indicator of the airbag's disabled state which is visible to both driver and passenger.

Therefore, it would be desirable to provide the driver the ability to select an activation or deactivation state for the passenger airbag. A selector switch and its associated circuitry are designed to accommodate both single point and distributed production airbag systems. Versatility in the selector switch assembly of the present invention is achieved through the use of a common printed circuit board which may accommodate different designs of the switch circuitry "stuffed" as well as be packaged into multiple locations in numerous types of vehicles. These advantages of the present invention minimize the number of components and reduce costs associated with implementing the switch assembly. Furthermore, it is desirable to provide a visible indicator of the airbag's disabled state which may easily be integrated with the switch assembly or remotely located from the switch assembly. Additionally, selector switch circuitry is provided that allows for monitoring of faulty switch conditions, as well as notifies the driver of any faulty conditions.

SUMMARY OF THE INVENTION

In accordance with the teachings of the present invention, an airbag control system is provided to disable an airbag in a motor vehicle. The airbag control system includes an airbag control module, a switching circuit with a first circuit path and a second circuit path, and a switch selectively movable between an enabled position, which interconnects the first circuit path to the airbag control module to activate the airbag, and a disabled position, which interconnects the second circuit path to the airbag control module to prevent activation of the airbag. In addition, the system includes a third circuit path with a first resistor in series with a second resistor which is placed in parallel with a second contact of the switch. A controller is electrically connected through the third circuit path to the switch. The controller detects the position of the switch based on the resistance value it senses in the third circuit path. Finally, a visual indicator is electrically connected to the controller. Selective moving of the switch to the disabled position sends a signal from the controller to illuminate the visual indicator.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
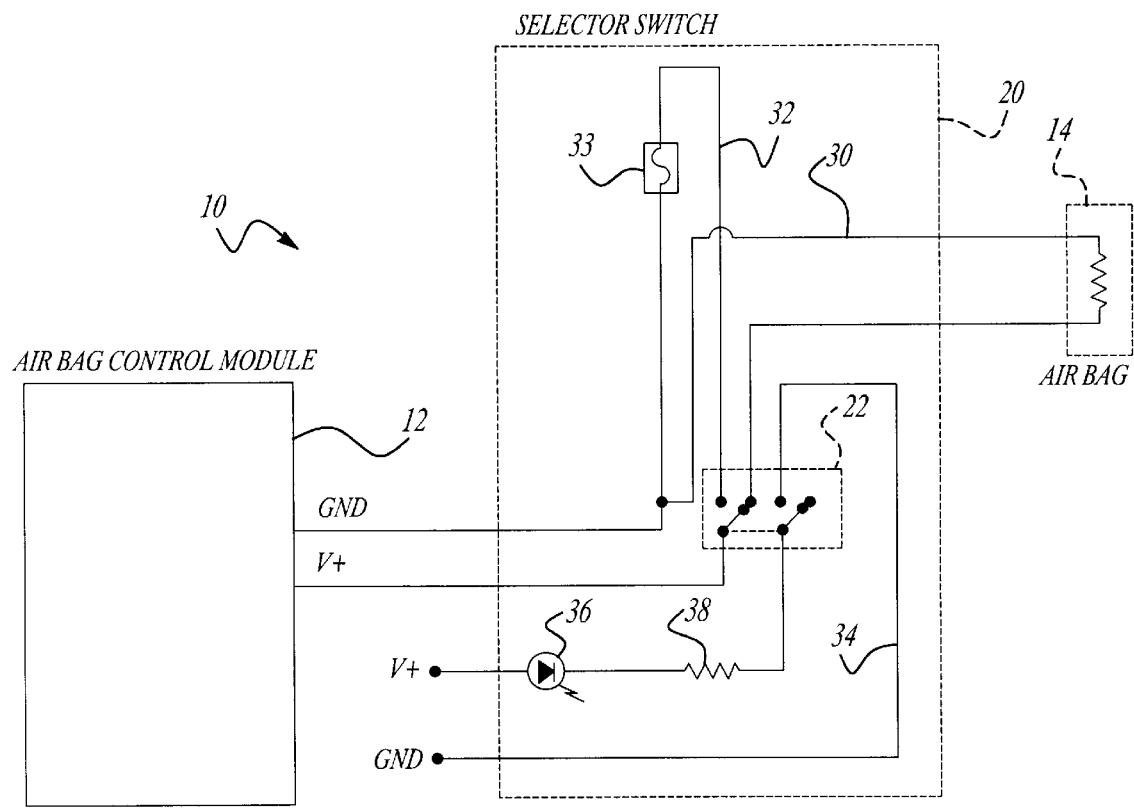
FIG. 1 is a schematic showing a first embodiment of a selector switch circuit of the present invention.

An airbag control system 10 to disable an airbag of an occupant restraint system in a motor vehicle is illustrated in FIG. 1. A selector switch assembly 20 is electrically connected between the airbag control/diagnostic module 12 and the airbag 14. A squib or other airbag activation devices may be used to inflate the airbag. Airbag control module 12 powers airbag control system 10. Upon detecting a vehicle accident condition airbag control module 12 will send an activation signal to inflate airbag 14.

Selector switch assembly 20 includes a single throw, double pole switch 22 that is integrated with a printed circuit board to provide selector switch circuitry. Deactivating the passenger airbag or another airbag in the vehicle is completed by inserting the ignition key into switch 22 and rotating the key from the airbag "on" position to the airbag "off" position. The use of a common printed circuit board accommodates different switch circuitry designs "stuffed", as well as facilitates the packaging or placing of switch assembly 20 at different locations within the vehicle.

The selector switch circuitry of switch assembly 20 includes a first circuit path 30 which interconnects airbag 14 with airbag control module 12 through a first switch contact. A second circuit path 32, including a telltale fuse 33 (ie. a resistive load) that interconnects with airbag control module 12 through a second switch contact. A third circuit path 34 runs from the ignition system (not shown) or other vehicle power source to a visual indicator 36 in series with a resistor 38. Visual indicator 36 may be a yellow "AIRBAG OFF" LED or other visual indicator as is well known in the art. It is also envisioned that other types of indicators, including audible, may be used in the present invention. Since the visual indicator is powered by the ignition system, it will only be illuminated when the ignition is turned on.

In operation, switch 22 is selectively movable between an enabled position, to activate the airbag 14, and a disabled position, which prevents activation of the airbag 14. In the enabled position, a closed circuit runs from a power supply terminal in the airbag control module 12, through a closed switch contact to the squib of airbag 14 and returns back to a return terminal in airbag control module 12. In addition, an open circuit runs from the ignition system through (an unlit) visual indicator 36 to an open switch contact. In the deactivated position, a closed circuit runs from a power supply terminal in airbag control module 12, through a closed switch contact to a low wattage dummy resistive load. The low wattage dummy resistive load is used as telltale fuse 33. A lead returns back to airbag control module 12. A closed circuit is also formed in third circuit path 34. The third circuit runs from the ignition system to illuminate visual indicator 36, through a closed switch, before returning to ground. It should be understood that when a (high current) activation signal is sent by airbag control module 12 to activate or fire the squib, while switch 22 is in a deactivated position, the signal will open telltale fuse 33 to provide an indication of the switch position during an airbag deployment. Moreover, since switch 22 is placed between the power supply terminal of the power supply and first circuit path 30, a short circuit along the second circuit path will not cause the squib to fire when an activation signal is sent while switch 22 is in a deactivated position.

Figure 2:
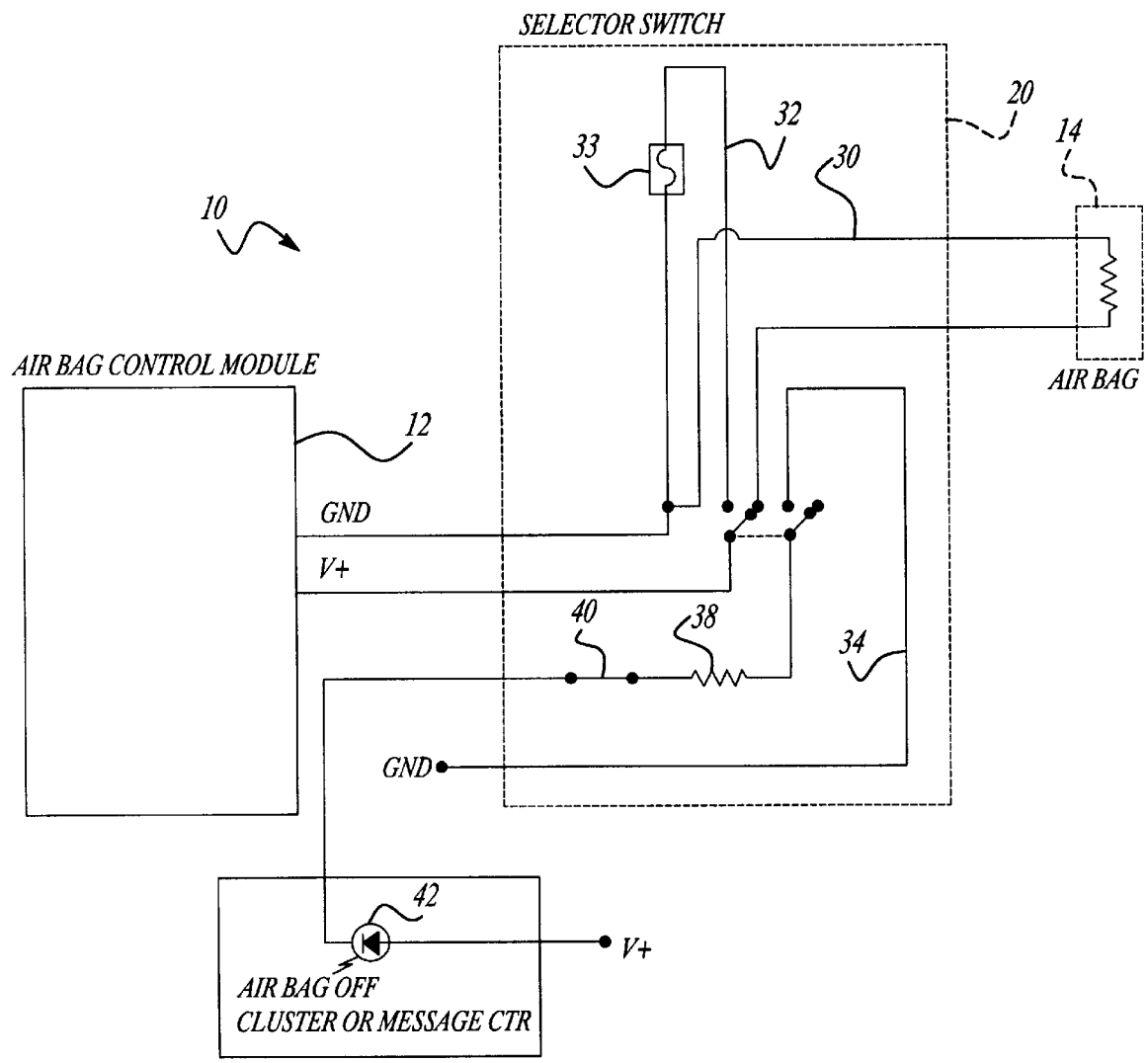
FIG. 2 is a schematic showing a second embodiment of a selector switch circuit of the present invention.

A second alternative embodiment of airbag control system 10 is shown in FIG. 2. Switch 22, including selector switch circuitry, are like the above described embodiment, with the following exception: a zero ohm jumper 40 is installed in place of the visual indicator on the printed circuit board to provide the system with remote LED indicator capability. A visual indicator 42 can be positioned remotely from the switch assembly 20, and thus be placed in a location visible to both the driver and passenger in accordance with Federal safety standards. In the deactivated switch position, a closed circuit runs from the ignition system to illuminate remotely located indicator 42, through a closed switch, before returning to ground. Optionally, resistor 38 may also be replaced by a zero ohm jumper (not shown) to provide the system with incandescent indicator capability.

Figure 3:
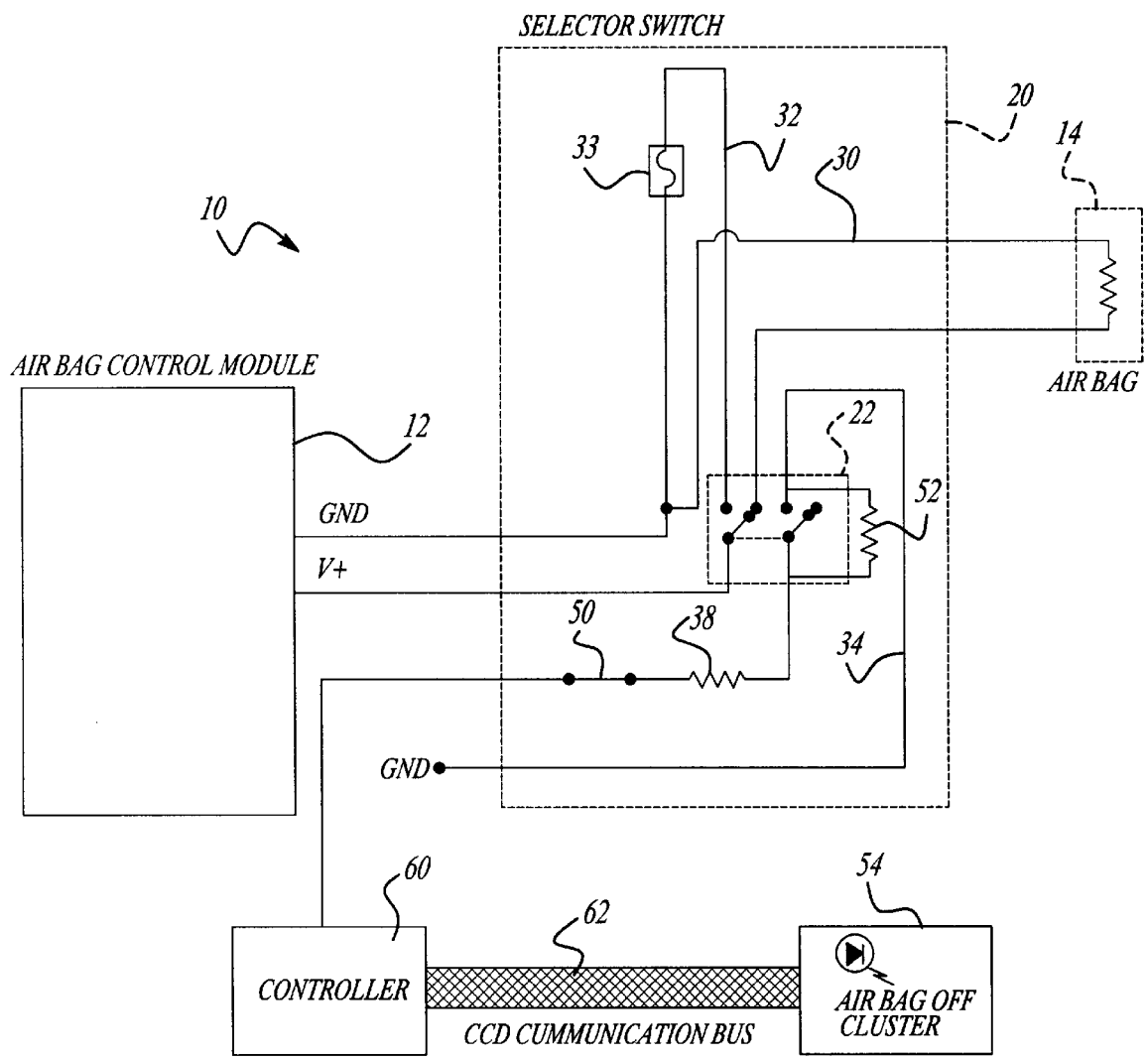
FIG. 3 is a schematic showing a third embodiment of a selector switch circuit of the present invention.

A third alternative embodiment of airbag control system 10 is provided in FIG. 3. Switch 22, including the selector switch circuitry, are also like the previously described embodiments. However, in the third circuit path 34, a zero ohm jumper 50 is installed in place of the visual indicator on the printed circuit board to provide the system with remote LED indicator capability. In addition, second resistor 52 which is in series with resistor 38 and jumper 50 is installed in parallel with a switch contact. A controller 60 is inserted between the third circuit path and a remotely located visual indicator 64. Unlike the other embodiments, the third circuit path, with second resistor 52, forms a closed circuit regardless of the switch position, and thus returns to ground. As a result, switch 22 serves as a resistive multiplexed analog signal to controller 60. Controller 60 detects the position of switch 22 based on the resistance value of the third circuit path. Thus, in the activated position (i.e., an open state) controller 60 will detect a large combined resistance value and in the deactivated position (i.e., closed state) will only see a smaller single resistance value. Based on the switch position, the controller 60 will send a bus message for the appropriate "AIRBAG OFF" indication across a CCD communication bus 62 to indicator 64. In addition, in the event of an airbag deployment, controller 60 will log the position of switch 22 to provide a backup to telltale fuse 33.

Furthermore, controller 60 also performs diagnostic checks on switch 22 based on the resistance value it detects in the third circuit path. If the average voltage level at controller 60 indicates that switch 22 is shorted to ground or open circuited, controller 60 will store a diagnostic trouble code indicating the appropriate switch failure. Also, the controller will indicate this switch failure to the driver by transmitting a signal to flash visual indicator 64. It is also envisioned that controller 60 may also provide additional software analysis in conjunction with airbag control system 10.

While the above description constitutes the preferred embodiment of the invention, it will be appreciated that the invention is susceptible to modification, variation, and change without departing from the proper scope or fair meaning of the accompanying claims.

We claim:

1. A selector switch system for disabling an airbag of a motor vehicle, comprising:

an electrical power source having a supply terminal and a return terminal;

a switch connected to the supply terminal of said power source;

a first circuit path connected to said switch for activating the airbag, said first circuit path having an airbag device; and a second circuit path connected to said switch for preventing activation of the airbag;

said switch selectively movable between an enabled position for enabling the airbag device by interconnecting the supply terminal of said power source to said first circuit path, and a disabled position for preventing activation of said airbag device by interconnecting the supply terminal of said power source to said second circuit path, whereby the supply terminal of said power source does not connect to said first circuit path in the disabled position.

2. The selector switch system of claim 1 wherein said first circuit path includes an airbag activation device and said second circuit path includes a fuse, wherein said fuse provides an open circuit in response to an activation signal, thereby indicative of the position of said switch.

3. The selector switch system of claim 1 further comprising a visual indicator electrically connected through a third circuit path to said switch, whereby selectively moving said switch to the disabled position thereby connecting said indicator to a second power source.

4. The selector switch system of claim 1 further comprising a third circuit path having a resistor and a visual indicator electrically connected to said third circuit path and remotely located from said switch, whereby selectively moving said switch to the disabled position connects said visual source to a second power source.

5. The selector switch system of claim 1 wherein said power source is supplied by an airbag control modular that is electrically connected to said switching circuit.

6. An airbag control system for disabling an airbag of a motor vehicle, comprising:

an airbag control module for supplying power, wherein the airbag control module includes a power supply terminal and a return terminal;

a switch connected to the power supply terminal of said airbag control module;

a first circuit path connected to said switch for activating the airbag, said first circuit path having an airbag device;

a second circuit path connected to said switch for preventing activation of the airbag, said switch selectively movable between an enabled position interconnecting the power supply terminal of said control module to said first circuit path and a disabled position interconnecting the power supply terminal of said control module to said second circuit path; whereby the supply terminal of said power source does not connect to said first circuit path in the disabled position; and a visual indicator electrically connected through a third circuit path to said switch, whereby selectively moving said switch to said disabled position illuminates said visual indicator.

7. The airbag control system of claim 6 wherein said first circuit path includes an airbag activation device and said second circuit path includes a resistive load, wherein said resistive load provides an open circuit in response to an activation signal, thereby indicative of the position of said switch.

8. The airbag control system of claim 6 wherein said visual indicator is replaced by a jumper on said circuit assembly, and said visual indicator is remotely located from said circuit assembly and electrically connected through said jumper to said switch.

9. An airbag control system for disabling an airbag of a motor vehicle, comprising:

an electrical power source;

a switching circuit having a first circuit path and a second circuit path;

a switch selectively movable between an enabled position interconnecting said first circuit path to said power source for receiving an activation signal to activate the airbag, and a disabled position interconnecting said second circuit path to said power source for receiving the activation signal and preventing activation of the airbag; and a third circuit path having a first resistor in series with a second resistor in parallel with a second contact of said switch, and a controller electrically connected through said third circuit path to said switch, whereby said controller detects the position of said switch based on the resistance value of said third circuit path.

10. The airbag control system of claim 9 wherein said first circuit path includes an airbag activation device and said second circuit path includes a fuse, wherein said fuse provides an open circuit in response to an activation signal, thereby indicative of the position of said switch.

11. The airbag control system of claim 9 further comprising a visual indicator electrically connected to said controller, whereby a signal is sent by said controller to activate said visual indicator in response to selectively moving said switch to the disabled position.

12. The airbag control system of claim 9 wherein said controller detects fault conditions of said switch based on the resistance value of said third circuit path.

* * * * *